United States Patent [19]

Nagase

[11] Patent Number: 4,524,186

[45] Date of Patent: Jun. 18, 1985

[54] PROCESS FOR PRODUCING WATER-ABSORBING RESINS

[75] Inventor: Hiroshi Nagase, Tokyo, Japan

[73] Assignee: Fujikura Kasei Co., Ltd., Tokyo, Japan

[21] Appl. No.: 517,838

[22] Filed: Jul. 27, 1983

[30] Foreign Application Priority Data

Oct. 6, 1982 [JP] Japan .................. 57-174564

[51] Int. Cl.³ .............................................. C08F 8/12
[52] U.S. Cl. ............................ 525/328.8; 525/330.6;
525/355; 525/369; 525/384; 525/450; 525/451;
526/320; 526/225; 526/328.5; 526/329.7
[58] Field of Search .............. 525/328.8, 330.6, 355,
525/369, 384, 450, 451; 526/320, 225, 328.5,
329.7

[56] References Cited

U.S. PATENT DOCUMENTS

| | | | |
|---|---|---|---|
| 3,926,891 | 12/1975 | Gross et al. ............... | 525/330.6 |
| 3,954,721 | 5/1976 | Gross ........................ | 525/384 |
| 3,957,711 | 5/1976 | Powanda et al. ........... | 526/328.5 |
| 3,966,679 | 6/1976 | Gross ........................ | 525/330.6 |
| 3,991,018 | 11/1976 | Strop et al. ............... | 525/328.8 |
| 4,090,013 | 5/1978 | Ganslaw et al. ........... | 525/328.8 |
| 4,313,863 | 2/1982 | Handa et al. .............. | 525/328.8 |

FOREIGN PATENT DOCUMENTS 1530397 10/1978 United Kingdom .

*Primary Examiner*—John Kight
*Assistant Examiner*—Kriellion Morgan
*Attorney, Agent, or Firm*—Wenderoth, Lind & Ponack

[57] ABSTRACT

A process for producing an absorbent resin, which comprises polymerizing 1 mole of a lower alkyl acrylate and 0.07 to 0.5 mole of a polyhydric alcohol ester of a monoethylenically unsaturated carboxylic acid in an aqueous medium in the absence of an emulsifying agent, saponifying the resulting polymer with a basic substance in a water-lower alcohol medium, and then neutalizing the saponification product with an acid.

22 Claims, No Drawings

PROCESS FOR PRODUCING WATER-ABSORBING RESINS

This invention relates to a process for producing water-absorbing resins which are insoluble in water and have the ability to absorb a large quantity of water. More specifically, this invention relates to a process for producing water-absorbing resins of high performance which can absorb a large quantity of an aqueous liquid such as water, physiological saline and urine within a very short period of time, have excellent retention of the liquid so absorbed, and are highly safe during use.

Water-absorbing resins are resins of a network structure resulting from the introduction of crosslinking sites into polymeric electrolytes. Generally, they are obtained by introducing suitable crosslinking sites into polymeric electrolytes which become water-soluble by dissociation in water and thereby making the electrolytes water-insoluble. Usually, these resins are called hydrogels. The water-absorbing resins produced by the present invention will also be referred to as "hydrogels" hereinafter.

Hydrogels having the ability to absorb water in an amount several tens of times to several hundred times their own weight have recently been developed, and their uses have been exploited in a wide range of fields, for example hygiene products such as feminine hygiene articles, paper diapers and disposable mops, water-holding materials for agriculture and horticulture, oil-water separating materials, solid-liquid separating materials for sludges, water absorbability imparting materials for ceilings, wall materials, etc. in the field of building and civil engineering, etc. They have already been commercially accepted in some of these fields.

Conventional hydrogels include, for example, a saponification product of a starch-acrylonitrile graft polymer, a graft polymer of starch (or cellulose)-sodium acrylate, a crosslinked polymer obtained by heat-treating a partial saponification product of polyacrylic acid, a copolymer of sodium (meth)acrylate and a crosslinking agent, a self-crosslinked copolymer of acrylic acid and sodium acrylate obtained by utilizing the property of acrylic acid to self-crosslink during polymerization, an ionically bonded complex polymer of polyacrylic acid obtained by using a polyvalent metal ion, a graft polymer of poly(sodium acrylate) and polyvinyl alcohol obtained by using the crystallinity of the latter, a polymer obtained by esterifying polyvinyl alcohol with a dibasic acid to introduce a crosslinks, and a polymer obtained by copolymerizing a vinyl ester and a (meth)acrylic acid ester and saponifying the resulting product with a basic substance. These hydrogels have various defects to be remedied. For example, they have poor durability, or insufficient water absorbing property, or poor water-holding property, or their productivity and safety (e.g., against toxicity) are not satisfactory.

Because the conventional hydrogels exemplified above have the characteristics of electrolytes, their absorption of salt solutions such as an aqueous solution of sodium chloride and artificial urine is about one-tenth that of distilled water. This gives rise to a problem in their practical uses as feminine hygiene articles, paper diapers, etc. It has therefore been strongly desired to develop hydrogels which have a high ability to absorb such salt solutions.

Since hydrogels are used in a wide range of fields relating to water, their uses are closely related to environments in which living organisms normally exist. Hence, remaining impurities, such as the unreacted materials, the unreacted crosslinking agent, saponification products of a low degree of polymerization, fragments of polymerization initiators, dispersing agents and emulsifiers, in the final products is undesirable. It is desired to remove these impurities as much as possible to avoid their adverse effects on living organisms and their environments.

The process provided by this invention meets these needs. The process of this invention comprises polymerizing 1 mole of a lower alkyl acrylate with 0.07 to 0.5 mole of a polyhydric alcohol ester of a mono-ethylenically unsaturated carboxylic acid in an aqueous medium in the absence of an emulsifier, saponifying the resulting polymer with a basic substance in a water-lower alcohol medium, and neutralizing the saponification product with an acid.

The process of this invention is a simple and economical process in which the polymerization and the saponification can be easily carried out, and which does not particularly require a special device or the pulverization of the resulting hydrogel. The hydrogels obtained by the process of this invention have excellent absorbability for various aqueous salt solutions as well as water and excellent water, retention. Moreover, they contain only very small amounts of soluble components, and are highly pure and safe. These properties are not observed in the conventional hydrogels.

The term "lower" used in the present specification and the appended claims means that a group or compound qualified by this term has not more than 6, preferably not more than 4, carbon atoms.

The process of this invention is described below in more detail.

The lower alkyl acrylate used as a starting monomer in the production of hydrogels in accordance with this invention is a component which imparts the properties of a polymeric electrolyte to the resulting hydrogel. Examples include methyl acrylate, ethyl acrylate, n-propyl acrylate, isopropyl acrylate, n-butyl acrylate, and isobutyl acrylate. These monomers can be used either singly or as a mixture of two or more. Methyl acrylate and ethyl acrylate are preferred in view of the ease of the saponification reaction with basic substances and the advantage of treating and re-using the by-product alcohol after the saponification.

The polyhydric alcohol ester of a monoethylenically unsaturated carboxylic acid to be copolymerized with the alkyl acrylate in accordance with the process of this invention is a monomer component which acts as a crosslinking site for the polymeric electrolyte and increases the absorbing ability of the resulting hydrogel for aqueous salt solutions such as an aqueous solution of sodium chloride and urine. Examples of the monoethylenically unsaturated carboxylic acid constituting the ester are monocarboxylic acids having 3 to 5 carbon atoms, such as acrylic acid, methacrylic acid, crotonic acid, isocrotonic acid and angelic acid. The polyhydric alcohol includes polyhydric alcohols containing 2 to 46 carbon atoms and 2 or 3 hydroxyl groups, such as ethylene glycol, propylene glycol, isopropylene glycol, butylene glycol, neopentylene glycol, glycerol, polyethylene glycol, polypropylene glycol, and polyisopropylene glycol. Typical examples of the polyhydric alcohol ester of the monoethylenically unsaturated carboxylic acid are those which have good water solubility, such as hydroxyethyl acrylate, hydroxyethyl methacrylate, hydroxypropyl acrylate, hydroxypropyl methacrylate, hydroxybutyl acrylate and hydroxybutyl methacrylate. They may be used either singly or as a mixture of two or more. Hydroxyethyl methacrylate is preferred because its safety to living organisms has already been confirmed.

The proportion of the polyhydric alcohol ester is 0.07 to 0.5 mole per mole of the lower alkyl acrylate. If the proportion of the polyhydric alcohol ester is less than 0.07 mole, the resulting hydrogel after absorbing water has a reduced strength and tends to become water-soluble. On the other hand, when it is larger than 0.5 mole, the absorbability of the resulting hydrogel for an aqueous liquid, especially an aqueous salt solution, is reduced. The especially preferred proportion of the polyhydric alcohol ester is 0.09 to 0.2 mole per mole of the lower alkyl acrylate. The copolymerization of the aforesaid monomers is carried out in an aqueous medium in the absence of an emulsifier. Aqueous media that can be used include water and mixtures of water with water-miscible organic solvents such as acetone, methyl ethyl ketone, methanol, ethanol, isopropanol, ethylene glycol, glycerol, dimethylformamide, tetrahydrofuran, and ethyl acetate. Water is preferred.

The copolymerization is carried out in such an aqueous medium by the dispersion polymerization method. The "dispersion polymerization method" denotes a method of copolymerizing the aforesaid monomers in the aforesaid aqueous medium in the absense of an emulsifier and in the presence of a polymerization initiator soluble in the aqueous medium. The polymer so obtained is very similar to one obtained by the emulsion polymerization method, but is advantageous in that since no emulsifier is used, the amount of impurities is very small.

Examples of the polymerization initiator used in the dispersion polymerization method are radical initiators such as persulfates, perphosphates, perborates, peracetic acid and hydrogen peroxide and redox initiators (e.g., combinations of potassium persulfate with sodium hydrogen bisulfate, metabisulfites, thiosulfates, reducing sugar, formaldehyde or sulfoxylates, or a combination of sodium azide with ammonium ceric sulfate or a combination of titanium trichloride with hydroxylamine). The persulfates, especially potassium persulfate and ammonium persulfate, are preferred. The use of such initiators can further improve the absorbing property of the resulting hydrogel.

The amount of the polymerization initiator is not particularly restricted. Generally, it is 0.01 to 1% by weight, preferably 0.02 to 0.07% by weight, based on the total weight of the monomers.

The dispersion polymerization in accordance with this invention can be carried out as in ordinary emulsion polymerization except that no emulsifier is used. For example, the aqueous medium and the polymerization initiator are fed into a reactor, and the initiator is dissolved by stirring. Then, the mixture was heated at a predetermined temperature (about 60° to about 80° C.) in a stream of an inert gas such as nitrogen. A mixture of the monomers was added, and then polymerized. When the generation of heat resulting from the polymerization of a (meth)acrylic monomer ceased, the mixture was heated to about 90° to about 98° C. to polymerize the unreacted monomers further. As a result, an aqueous dispersion polymer can be obtained.

The resulting polymer is then saponified with a basic substance in a water-lower alcohol medium. Examples of the basic substance which can be used for the saponification include alkali metal hydroxides such as sodium hydroxide and potassium hydroxide, alkali metal carbonates such as sodium carbonate and potassium carbonate, alkanolamines, and other amines such as ammonium hydroxide. Sodium hydroxide is most preferred. The amount of the basic substance is not strictly limited, and can be varied widely with the kind of the basic substance, etc. Generally, it is advantageously used in an amount of 0.9 to 1.5 equivalents, preferably 1.0 to 1.2 equivalents, per mole of the lower alkyl acrylate used in the polymerization.

One characteristic feature of the process of this invention is that the saponification is carried out in a water-lower alcohol medium. By using the water-lower alcohol medium, the saponification of the polymer can be terminated smoothly within a short period of time, and the saponification product is obtained as a slurry finely dispersed in the medium. The slurry is very convenient to handle. Examples of the lower alcohol used in the medium are methanol, ethanol, n-propanol and isopropanol, which may be used singly or in combination. The amount of the lower alcohol is not particularly limited. Generally, it is advantageously used in an amount of at least 60 parts by weight, preferably 65 to 200 parts by weight, per 100 parts by weight of water in the reaction system. If the amount of the lower alcohol is less than 60 parts by weight, the viscosity of the slurry obtained by the saponification becomes high, and its handling tends to be difficult.

The aqueous dispersion polymer obtained by the aforesaid copolymerization can be saponified without removing the aqueous medium, etc. used in the polymerization reaction. The saponification can be carried out by adding an aqueous solution of the basic substance and a lower alcohol to the polymer, and heating the mixture at about 65° C. to the refluxing temperature of the mixture. The method of adding the aqueous solution of the basic substance and the lower alcohol is not particularly limited. They may be added simultaneously, or sequentially. Generally, when the alcohol is added all at once, the polymer tends to be swollen and become a highly viscous gel. Advantageously, there is used a method which comprises gradually adding about 20 to about 50% by weight of all of the aqueous solution of the basic substance to be used, then adding about 20 to about 50% of all the lower alcohol to be added, and thereafter simultaneously adding the remaining aqueous solution of the basic substance and the remaining lower alcohol because this permits stable coagulation of the polymer and uniform saponification.

The saponification can be carried out for 2 to 5 hours under the above conditions. The reaction may be terminated completely by heating the reaction mixture further for about 1 to about 2 hours at the azeotropic temperature of the water-alcohol; or by evaporating the azeotrope partly, freshly adding the alcohol, again evaporating the azeotrope, and performing the reaction while decreasing the amount of water in the reaction system. The technique of completing the saponification reaction while partly evaporating the azeotrope as above is particularly advantageous because it facilitates the subsequent steps, i.e. neutralization with an acid and a subsequent treating step.

The saponification product is then neutralized with an acid. Acids which can be used for the neutralization include inorganic acids such as hydrochloric acid, sulfuric acid and nitric acid. In particular, it is preferred to use hydrochloric acid in the form of an aqueous solution having a low concentration of about 0.5 to about 3 normality. The amount of the acid used may be adjusted to such a value that after neutralization, the pH of the aqueous medium becomes about 6.5 to about 7.5.

The hydrogel obtained as a slurry in this manner is then after-treated by methods known per se to recover it as a dry gel.

For example, a lower alcohol such as methanol, ethanol, n-propanol or isopropanol is added to the slurry of the reaction product subjected to neutralization treatment to coagulate and precipitate the hydrogel in the dispersion, which is then separated upon standing. Water is added to the separated hydrogel to swell it, and the hydrogel is then washed with acetone, whereupon the hydrogel becomes fine particles which are then separated by such means as standing up or filtration.

Generally, hydrogels do not absorb alcohols or acetone, but absorb a water-alcohol mixture and a water-acetone mixture and thus become swollen. At this time, the concentration of acetone is about 45% by weight and the concentration of the alcohol is about 80% by weight for methanol and about 45% by weight for ethanol. When the concentration of the alcohol and acetone become higher than the above-specified values, the hydrogels have the property of releasing water and becoming a flocculated mass. The present invention is based on this property of hydrogels. It has been found in accordance with this invention that soluble components in the hydrogel can be effectively removed to an amount of not more than 1%, as can be seen from Examples given hereinbelow, by swelling the hydrogel obtained by the aforesaid neutralization with water, washing the swollen hydrogel with the alcohol to form a flocculated mass, separating the flocculated mass, again swelling it with water, then washing the swollen product with acetone, separating the flocculated mass by standing and then drying it.

Desirably, therefore, the hydrogel produced by the process of this invention is after-treated by washing with alcohols and acetone. This treatment can give a hydrogel of high purity with a low content of soluble components. Since the hydrogel after drying is in the form of fine particles, there is no need to pulverize it as in the case of conventional hydrogels. Hence, the process of this invention is industrially very advantageous. If required, washings with alcohols and acetone may be repeated two or more times.

The hydrogel produced by the process of this invention described hereinabove does not contain impurities such as an emulsifier, a dispersing agent, etc., contains little soluble components, has high safety and a great absorptive power for aqueous salt solutions as well as water, and possesses excellent liquid retaining ability. It can therefore be used widely, for example, as hygiene products such as feminine hygiene articles, paper diapers, and disposable mops, water holding materials for agriculture and horticulture, oil-water separating materials, solid-liquid separating materials for sludges, and water-absorbability imparting materials for ceiling and wall materials.

The following Examples and Comparative Examples illustrate the present invention in greater detail.

EXAMPLE 1

A 1000 ml separating cylindrical flask equipped with a stirrer, a condenser, a thermometer, a nitrogen introducing tube and a dropping funnel was charged with 300 g of distilled water and 0.085 g of potassium persulfate (to be abbreviated as KPS), and with stirring at 300±10 rpm, the contents of the flask was heated. When the temperature of the contents of the flask reached 70° C., a monomeric mixture consisting of 86 g of methyl acrylate and 10 g of hydroxyethyl methacrylate was added dropwise at a rate of 2 ml/min. In about 10 minutes after the start of addition, the contents of the flask became milky white.

Subsequently, the reaction was carried out for 2 hours while maintaining the temperature of the contents at 70°±0.5° C. The temperature of the contents was raised to 95° C., and the contents were maintained at this temperature for 1 hour. The reaction mixture was cooled to 30° C. Then, an alkaline solution obtained by dissolving 40 g of sodium hydroxide (to be referred to as NaOH hereinafter) in a mixture of 50 g of water and 400 g of ethanol was introduced gradually into the flask through a dropping funnel. After adding all of the solution, the mixture was heated. In 5 minutes, the temperature of the contents reached 40° C., and the contents became gel-like, but they had flowability and could be stirred.

On further heating, the temperature of the contents of the flask reached 70° C., and the gel-like contents became a white suspension (to be referred to as a slurry hereinafter). The temperature was further raised, and the temperature of the contents was maintained at the azeotropic temperature of water/ethanol, and the saponification reaction was continued for 5 hours. Then, the reaction mixture was cooled. When the cooled product was neutralized with 10 g of 1N hydrochloric acid, the contents has a pH of 7.2.

The contents were transferred to a 3-liter beaker. The amount of the remaining contents in the flask was 23 g which was 25% by weight based on the entire charge.

Ethanol (300 g) was added to the reaction mixture, and the mixture was stirred for 30 minutes and then left to stand. The supernatant liquid was removed. The residue was swollen with 200 g of pure water and with stirring, 500 g of ethanol was added. The mixture was left to stand, and the supernatant liquid was removed. The residue was then swollen with 200 g of pure water, and with stirring, 500 g of acetone was added to give a precipitate of fine particles. The supernatant liquid was removed, and the residue was dispersed in 300 g of acetone. The dispersion was filtered, dried under reduced pressure at 60° C. for 24 hours, and separated by a 20-mesh sieve. All the dried product passed through the sieve and no pulverizing step was necessary.

The resulting hydrogel absorbed 550 times its weight of distilled water, 72 times its weight of 0.9% salt solution and 63 times its weight of artificial urine when measured by the method described below. The amount of soluble components in the hydrogel, measured by the following method, was 0.46%.

(1) Measurement of the amount of liquid absorbed

One gram of the hydrogel was added to distilled water or a salt solution. After the lapse of three hours, the mixture was filtered on a 100-mesh sieve. The weight of the filtrate was measured, and expressed in times the weight of the original dried hydrogel.

(2) Measurement of soluble components

Five grams of the hydrogel was accurately weighed, and the subjected to Soxhlet extraction with a mixture of 40 g of water, 20 g of methanol and 40 g of acetone for 5 hours and then extracted with acetone for 1 hour.

The extract was dried, and the amount lost was expressed by weight percent.

EXAMPLE 2

The same reactor as used in Example 1 was charged with 300 g of distilled water and 8.08 g of KPS, and with stirring, the contents was heated to 75° C. Then, a monomeric mixture consisting of 100 g of ethyl acrylate and 13 g of hydroxyethyl methacrylate was added dropwise at 2 ml/min. In about 15 minutes after starting the addition, the contents of the flask became milky white. Subsequently, the reaction was carried out for 2 hours while maintaining the temperature of the inside of the flask at 75°±5° C. Then, the temperature of the inside of the flask was raised to 95° C., and the contents were maintained at that temperature for 1 hour. The reaction mixture was cooled to 70° C., and an aqeuous alkaline solution consisting of 40 g of sodium hydroxide, 50 g of water and 400 g of isopropanol was added over the course of 10 minutes.

Upon completion of the addition, the contents of the reactor became gel-like but could be stirred. In about 10 minutes, they became a slurry.

After slurrying, the slurry was heated for 2 hours at the azeotropic temperature of water/isopropanol. Then, 220 g of the water/isopropanol azeotrope was distilled off, and the residue was reacted under reflux for 2 hours.

The saponification product obtained was a slurry having a higher viscosity than that obtained in Example 1, but had flowability and could be taken out easily from the reactor. The amount of the remaining contents of the flask was 3.2%.

To the slurry was added 500 g of isopropanol, and the mixture was stirred for 30 minutes. When 10 g of 1N-HCl was added, the pH of the mixture became 6.8, After standing, the supernatant liquid was removed, and with stirring, 300 g of acetone was added to precipitate fine particles. The precipitate was collected by filtration, dried under reduced pressure at 60° C. for 12 hours, and separated on a 20-mesh sieve. All the particles passed through the sieve.

The resulting hydrogel absorbed 750 times its weight of distilled water, 104 times its weight of 0.9% salt solution and 87 times its weight of artificial urine.

The amount of soluble components present in the hydrogel was 0.21%.

EXAMPLE 3

By using the same reactor as used in Example 1, 330 g of distilled water, 35 g of ethyl acrylate, 51 g of butyl acrylate and 13 g of hydroxypropyl acrylate were heated to 75° C. with stirring. Then, 0.04 g of KPS was added, and the mixture was reacted for 2 hours. The temperature of the inside of the reactor was then raised to 95° C. The reaction mixture was heat-treated at this temperature for 1 hour and cooled to 70° C.

Then, 100 g of n-propyl alcohol was added, and an aqueous solution of 20 g of sodium hydroxide in 25 g of water was added. Furthermore, 170 g of n-propyl alcohol was added. In about 30 minutes, the mixture became a slurry. Hence, the temperature was raised to 90° C., and the slurry was reacted for 3 hours. Then, the slurry was transferred to a 3-liter beaker, and 330 g of n-propyl alcohol was added. Then, 5 g of 1N-HCl was added to adjust its pH to 6.6. The slurry was left to stand, and the precipitate was recovered. The precipitate was dispersed in a mixture of 100 g of water and 300 g of acetone to form fine particles which were dried at 60°C. for 12 hours.

The resulting hydrogel absorbed 565 times its weight of distilled water, 82 times its weight of 0.9% salt solution, and 69 times its weight of artificial urine. The amount of soluble components present in the hydrogel was 0.26%.

EXAMPLE 4

By using the same reactor as used in Example 1, 400 g of distilled water, 50 g of methyl acrylate, 46 g of propyl acrylate and 35 g of hydroxyethyl acrylate were heated to 70° C. with stirring. Then, 0.07 g of KPS was added, and the mixture as reacted for 3 hours. Furthermore, 0.01 g of KPS was added, and the mixture was heated to 95° C. and reacted for 1 hour. The reaction mixture was cooled to 70° C.

Then, 300 g of isopropyl alcohol was added, and an aqueous solution of 40 g of sodium hydroxide in 50 g of water was added. The mixture was heated, and reacted for 1 hour at the azeotropic temperature of water/isopropanol. After 150 g of the azeotrope was distilled off, 200 g of methanol was added. When 150 g of a distillate formed at 77° C. was recovered, the reaction mixture was cooled. Ten grams of 1N-HCl was added, and the mixture was stirred for 30 minutes. The resulting reaction mixture was added to 500 g of methanol with stirring, and the mixture was left to stand. The precipitate was recovered.

Water (200 g) was added to the precipitate to swell it, and with stirring, 500 g of acetone was added. The mixture was left to stand. The supernatant liquid was removed, and the residue was dispersed in 300 g of acetone. The dispersion was filtered to recover a hydrogel.

The resulting hydrogel as a 1% aqueous solution had a pH of 7.3, and absorbed 420 times its weight of distilled water, 63 times its weight of 0.9% salt solution and 58 times its weight of artificial urine. The amount of soluble components present in the hydrogel was 0.09%.

EXAMPLE 5

By using the same reactor as in Example 1, 64 g of isobutyl acrylate, 32.5 g of hydroxypropyl methacrylate and 330 g of distilled water were heated to 70° C. with stirring. Then, 0.04 g of KPS was added, and the reaction was carried out for 3 hours. The temperature of the inside of the reactor was raised to 95° C., and the mixture was heat-treated for 1 hour. Then, the reaction mixture was cooled to 70° C.

Then, an alkaline solution consisting of 20 g of sodium hydroxide, 10 g of water and 500 g of methanol was added, and the mixture was reacted for 6 hours. The reaction mixture was cooled, and put in 500 g of acetone with stirring. The mixture was left to stand and the supernatant was removed. The residue was swollen with a mixture of 100 g of water and 100 g of acetone, and then 5 g of 1N-HCl was added to adjust the pH to 6.5.

Acetone (300 g) was further added, and the precipitate was collected by filtration and dried at 110° C. for 3 hours.

The resulting hydrogel absorbed 270 times its weight of distilled water, 48 times its weight of 0.9% salt solution and 37 times its weight of artificial urine. The amount of soluble components present in the hydrogel was 0.07%.

COMPARATIVE EXAMPLE 1

By the same procedure as in Example 1, ethyl acrylate and hydroxyethyl methacrylate were copolymerized, and cooled. Sodium hydroxide (40 g) was dissolved in 400 g of distilled water, and the solution was gradually added to the copolymer so as to avoid abrupt cohesive destruction. After adding all of the solution, temperature elevation was started. In about 10 minutes, the mixture became gel-like and its stirring became impossible. The temperature of the inside of the reactor was raised to 80° C., and the reaction was further carried out for 5 hours. The contents of the reactor did not at all show flowability. After cooling, the contents could not flow by their own weight. Therefore, the contents were transferred to a 5-liter beaker by using a spatula, and 1000 g of methanol was added. When the mixture was stirred, it showed flowability but did not become slurry-like. When methanol was further added, the mixture became slurry-like at a time when the total amount of methanol reached 4000 g.

To adjust the pH of the slurry to 7.2, 106 g of 1N-HCl was required. This shows that 0.106 mole of methyl acrylate remained unsaponified. The amount of soluble components present therein was 8.7%.

COMPARATIVE EXAMPLE 2

A polymer was prepared by the same procedure as in Example 1 except that the amount of methyl acrylate was changed to 86 g, and the amount of hydroxyethyl methacrylate was changed to 65 g.

Water (200 g) was added to 0.2 g of this polymer, and the mixture was allowed to stand overnight. Then, when the mixture was put in a 200-mesh sieve in order to measure the amount of water absorbed, all of the mixture passed through the wire gauze, and an absorbant gel could not be obtained.

COMPARATIVE EXAMPLE 3

A polymer was prepared by the same procedure as in Example 1 except that the amount of methyl acrylate was changed to 86 g and the amount of hydroxypropyl methacrylate was changed to 79 g.

This polymer absorbed only 57 times its weight of distilled water.

COMPARATIVE EXAMPLE 4

By using the same reactor as in Example 1, 300 g of distilled water, 100 g of ethyl acrylate and 19.5 g of hydroxyethyl methacrylate were heated to 75° C. with stirring. Then, 0.08 g of KPS was added, and the reaction was carried out for 2 hours. The reaction mixture was then heat-treated at 95° C. for 1 hour, and cooled to 70° C.

Then, an alkaline solution consisting of 40 g of sodium hydroxide, 50 g of water, 200 g of methanol and 200 g of isopropanol was added, and with stirring, the mixture was heated to 75° C. to slurry it. Then, the slurry was cooled when 300 g of a fraction at 77° C. was distilled off. After cooling, 10 g of 1N-HCl was added to adjust the pH to 7.2.

Two hundred grams of isopropanol was added to precipitate the resulting product. The precipitate was washed with 200 g of water and 2000 g of methanol, and dried under reduced pressure at 60° C. for 12 hours.

The resulting hydrogel absorbed 680 times its weight of distilled water, 110 times its weight of 0.9% salt solution and 88 times its weight of artificial urine. The amount of soluble components was 5.7%, however.

COMPARATIVE EXAMPLE 5

0.3 g of each of the hydrogels obtained in Example 2 and Comparative Example 4 was weighed, and dispersed in 300 g of No. 5 silica sand. The dispersed product was put into a Petri dish (105 mm$\phi$ × 50 mm). Water (100 g) was added, and the dispersed product was spontaneously dried at room temperature. The surface layer portion of the dispersed product containing the hydrogel of Comparative Example 4 solidified to a thickness of about 5 mm. When 100 g of water was added, no penetration of water to the bottom portion was observed. This is presumably because the soluble components acted as a bridging agent for the aggregates. When the hydrogel of Example 2 was used, rapid penetration of water was observed without any trouble.

What is claimed is:

1. A process for producing an absorbent resin, which comprises polymerizing 1 mole of a lower alkyl acrylate and 0.07 to 0.5 mole of a polyhydric alcohol ester of a monoethylenically unsaturated carboxylic acid in an aqueous medium in the absence of an emulsifying agent, saponifying the resulting polymer with a basic substance in a water-lower alcohol medium to produce a gel-like saponification product, and then neutralizing the saponification product with an acid.

2. The process of claim 1 wherein the lower alkyl acrylate is methyl acrylate or ethyl acrylate.

3. The process of claim 1 wherein the monoethylenically unsaturated carboxylic acid contains 3 to 5 carbon atoms.

4. The process of claim 3 wherein the monoethylenically unsaturated carboxylic acid is acrylic acid, methacrylic acid, crotonic acid, isocrotonic acid or angelic acid.

5. The process of claim 1 wherein the polyhydric alcohol has 2 to 46 carbon atoms and 2 or 3 hydroxyl groups.

6. The process of claim 1 wherein the polyhydric alcohol is ethylene glycol, propylene glycol, isopropylene glycol, butylene glycol, neopentylene glycol, glycerol, polyethylene glycol, polypropylene glycol, or polyisopropylene glycol.

7. The process of claim 1 wherein the polyhydric alcohol ester is hydroxyethyl acrylate, hydroxethyl methacrylate, hydroxypropyl acrylate, hydroxypropyl methacrylate, hydroxybutyl acrylate or hydroxybutyl methacrylate.

8. The process of claim 7 wherein the polyhydric alcohol ester is hydroxyethyl methacrylate.

9. The process of claim 1 wherein the amount of the polyhydric alcohol ester is 0.09 to 0.2 mole per mole of the lower alkyl acrylate.

10. The process of claim 1 wherein the aqueous medium is water.

11. The process of claim 1 wherein the polymerization is carried out in the absence of a polymerization initiator.

12. The process of claim 11 wherein the polymerization initiator is a persulfate salt.

13. The process of claim 11 wherein the amount of the polymerization initiator is 0.01 to 1% by weight based on the total weight of the monomers.

14. The process of claim 1 wherein the basic substance is sodium hydroxide.

15. The process of claim 1 wherein the amount of the basic substance is 0.9 to 1.5 equivalents per mole of the lower alkyl acrylate.

16. The process of claim 1 wherein the lower alcohol is methanol, ethanol, n-propanol or isopropanol.

17. The process of claim 1 wherein the amount of the lower alcohol is 65 to 200 parts by weight per 100 parts by weight of water in the reaction system.

18. The process of claim 1 wherein the saponification is carried out at about 65° C. to the refluxing temperature of the reaction mixture.

19. The process of claim 1 wherein the saponification reaction is completed while evaporating a part of the water-lower alcohol azeotrope.

20. The process of claim 1 wherein the neutralization with the acid is carried out by using 0.5–3N hydrochloric acid.

21. The process of claim 1 wherein after the neutralization with the acid, the polymer is successively washed with an alcohol and acetone.

22. A water-absorbing resin prepared by the process of claim 1.

* * * * *